(12) United States Patent
Brandon et al.

(10) Patent No.: US 9,324,507 B2
(45) Date of Patent: Apr. 26, 2016

(54) SYSTEMS AND METHODS FOR IMPLEMENTING HIGH-TEMPERATURE TOLERANT SUPERCAPACITORS

(71) Applicant: California Institute of Technology, Pasadena, CA (US)

(72) Inventors: Erik J. Brandon, Pasadena, CA (US); William C. West, South Pasadena, CA (US); Ratnakumar V. Bugga, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 71 days.

(21) Appl. No.: 14/301,273

(22) Filed: Jun. 10, 2014

(65) Prior Publication Data

US 2014/0362495 A1    Dec. 11, 2014

Related U.S. Application Data

(60) Provisional application No. 61/833,344, filed on Jun. 10, 2013.

(51) Int. Cl.
*H01G 11/32*    (2013.01)
*H01G 11/18*    (2013.01)
(Continued)

(52) U.S. Cl.
CPC ............... *H01G 11/18* (2013.01); *H01G 11/32* (2013.01); *H01G 11/38* (2013.01); *H01G 11/52* (2013.01); *H01G 11/62* (2013.01); *Y02E 60/13* (2013.01)

(58) Field of Classification Search
CPC ........... H01G 9/00; H01G 9/02; H01G 9/022; H01G 9/038
USPC .................. 361/502, 503–504, 512, 516–519
See application file for complete search history.

(56) References Cited

U.S. PATENT DOCUMENTS

| 5,827,602 | A  | 10/1998 | Koch et al. |
| 7,990,676 | B2 | 8/2011  | Topaloglu   |

(Continued)

FOREIGN PATENT DOCUMENTS

| JP | 03129914 A    | 6/1991  |
| JP | 05021281 A    | 1/1993  |
| JP | 2012186452 A  | 9/2012  |
| WO | 2013142246 A1 | 9/2013  |
| WO | 2013142246 A8 | 10/2014 |
| WO | 2014201051 A1 | 12/2014 |

OTHER PUBLICATIONS

Galinski et al., "Ionic liquids as electrolytes", Electrochimica Acta 51, 2006, pp. 5567-5580.

(Continued)

*Primary Examiner* — Nguyen T Ha
(74) *Attorney, Agent, or Firm* — KPPB LLP (57) ABSTRACT

Systems and methods in accordance with embodiments of the invention implement high-temperature tolerant supercapacitors. In one embodiment, a high-temperature tolerant super capacitor includes a first electrode that is thermally stable between at least approximately 80° C. and approximately 300° C.; a second electrode that is thermally stable between at least approximately 80° C. and approximately 300° C.; an ionically conductive separator that is thermally stable between at least approximately 80° C. and 300° C.; an electrolyte that is thermally stable between approximately at least 80° C. and approximately 300° C.; where the first electrode and second electrode are separated by the separator such that the first electrode and second electrode are not in physical contact; and where each of the first electrode and second electrode is at least partially immersed in the electrolyte solution.

19 Claims, 5 Drawing Sheets

(51) Int. Cl.
*H01G 11/62* (2013.01)
*H01G 11/52* (2013.01)
*H01G 11/38* (2013.01)

(56) References Cited

U.S. PATENT DOCUMENTS

| | | | |
|---|---|---|---|
| 8,760,851 B2* | 6/2014 | Signorelli | H01G 11/32 361/502 |
| 8,796,932 B2 | 8/2014 | Manohara et al. | |
| 8,860,114 B2 | 10/2014 | Yen et al. | |
| 2002/0047154 A1 | 4/2002 | Sowlati et al. | |
| 2003/0036244 A1 | 2/2003 | Jones et al. | |
| 2008/0061700 A1 | 3/2008 | Blick | |
| 2008/0180883 A1 | 7/2008 | Palusinski et al. | |
| 2008/0285208 A1* | 11/2008 | Sung | H01G 9/038 361/502 |
| 2009/0225490 A1 | 9/2009 | Liao et al. | |
| 2010/0009511 A1 | 1/2010 | Quinlan et al. | |
| 2010/0020468 A1 | 1/2010 | Tan et al. | |
| 2010/0028074 A1 | 2/2010 | Etling | |
| 2010/0085672 A1 | 4/2010 | Savin et al. | |
| 2010/0177461 A1 | 7/2010 | Tuncer | |
| 2010/0233523 A1 | 9/2010 | Jo et al. | |
| 2010/0264032 A1 | 10/2010 | Bazant | |
| 2011/0049674 A1 | 3/2011 | Booth, Jr. et al. | |
| 2012/0017408 A1 | 1/2012 | Masuda et al. | |
| 2012/0044613 A1 | 2/2012 | Cho et al. | |
| 2012/0154979 A1 | 6/2012 | Signorelli et al. | |
| 2012/0225358 A1 | 9/2012 | Seo et al. | |
| 2013/0247678 A1 | 9/2013 | Manohara et al. | |
| 2013/0249598 A1 | 9/2013 | Manohara et al. | |
| 2013/0250479 A1 | 9/2013 | Manohara et al. | |
| 2013/0342953 A1 | 12/2013 | Subramanyam | |
| 2013/0342962 A1 | 12/2013 | Fletcher et al. | |
| 2014/0029161 A1 | 1/2014 | Beidaghi et al. | |
| 2014/0184364 A1 | 7/2014 | McMillon et al. | |
| 2015/0048482 A1 | 2/2015 | Shih | |

OTHER PUBLICATIONS

Kroon et al., "Quantum chemical aided prediction of the thermal decomposition mechanisms and temperatures of ionic liquids", Thermochimica Acta, 2007, vol. 465, pp. 40-47.
Sato et al., "Electrochemical properties of novel ionic liquids for electric double layer capacitor applications", Electrochimica Acta, 2004, vol. 49, pp. 3603-3611.
Sidelecka et al., "Stability of Ionic Liquids in Application Conditions", Current Organic Chemistry, 2011, vol. 15, pp. 1974-1991.
International Search Report and Written Opinion for International Application PCT/US2014/041792, report completed Sep. 24, 2014, 8 Pgs.
International Preliminary Report on Patentability for International Application PCT/US2013/031285, report completed Jun. 26, 2013, Mailed Oct. 2, 2014, 7 Pgs.
International Search Report and Written Opinion for International Application PCT/US2013/031285, completed Jun. 26, 2013, 9 pgs.
Chen, "Approximate Calculating Methods Concerning the Electron Transit Time for a Vacuum Microelectronics Triode," J. Phys. D: Appl. Phys 33 (2000) L39-L43, Nov. 24, 1999.
Ghosh et al., "Nanodiamond lateral field emission vacuum logic OR gate", Electronics Letters, Aug. 4, 2011, vol. 47, No. 16, 2 pgs.
Grzybowski et al., "High Temperature Performance of Polymer Film Capacitors", Journal of Microelectronic Packaging, vol. 1, 1998, pp. 711-716.
Manohara et al., "Carbon Nanotube-Based Digital Vacuum Electronics and Miniature Instrumentation for Space Exploration", Proc. of SPIE vol. 7594, 75940Q-1.
Manohara et al., "Carbon Nanotube-Based High Temperature Vacuum Microelectronics for E&P Applications", SPE 156947, Jun. 12, 2012.
Manohara et al., "11.2: "Digital" Vacuum Microelectronics: Carbon Nanotube-Gased Inverse Majority Gates for High Temperature Applications", IEEE, 2010, pp. 203-204.
Nusil Silicone Technology LLC, "Conductive Silicones in Elevated Temperatures", 5 pgs.
Sergent, "Discrete Passive Components for Hybrid Circuits, Chapter 8", 40 pgs.
Wacker, "High-Performance Silicones for Transmission and Distribution", 52 pgs.
Watson et al., "High-Temperature Electronics Pose Design and Reliability Challenges", Analog Dialogue, 46-04, Apr. 2012, pp. 1-7.
Zhang et al., "Lateral vacuum microelectronic logic gate design", J. Micromech. Microeng., 1991, pp. 126-134.
International Preliminary Report on Patentability for International Application PCT/US2014/041792, Report issued Dec. 15, 2015, Mailed Dec. 23, 2015, 6 Pgs.
International Search Report and Written Opinion for International Application No. PCT/US2013/031285, report completed Jun. 26, 2013, Mailed Jun. 26, 2013, 9 pages.

* cited by examiner

SYSTEMS AND METHODS FOR IMPLEMENTING HIGH-TEMPERATURE TOLERANT SUPERCAPACITORS

CROSS-REFERENCE TO RELATED APPLICATIONS

The current application claims priority to U.S. Provisional Application No. 61/833,344, filed Jun. 10, 2013, the disclosure of which is incorporated herein by reference.

STATEMENT OF FEDERAL FUNDING

The invention described herein was made in the performance of work under a NASA contract, and is subject to the provisions of Public Law 96-517 (35 U.S.C. 202) in which the Contractor has elected to retain title.

FIELD OF THE INVENTION

The present invention generally relates to high-temperature tolerant supercapacitors.

BACKGROUND

Capacitors are devices that can store charge. Generally, conventional capacitors consist of two conducting objects placed near each other but not in direct contact with one another; accordingly, a potential difference across the conductors can be established, and the capacitor can thereby be said to be storing energy electrostatically in the corresponding electric field. Capacitors are widely used in electronic circuits. For example, they can be used to store energy for later use, as in a camera flash, or alternatively as energy backup in case of a power failure. Capacitors can also be used to: block surges of power to protect circuits; form parts of a radio; and serve as memory for binary code in random access memory (RAM). The energy stored in a conventional capacitor is a function of the potential difference across its conductors as well as its capacitance, which is generally an inherent property of the capacitor. Capacitance is typically measured in farads, which is equal to coulombs per volt.

Supercapacitors (also known as ultracapacitors, electrochemical capacitors, or double-layer capacitors) represent relatively recent developments in the field of capacitors. Supercapacitors utilize similar principles as conventional capacitors insofar as they are configured to store energy in electrostatic fields; however, they implement different architectures and thereby achieve much higher capacitances. For example, whereas conventional capacitors typically have capacitances in the range of microfarads, supercapacitors can have capacitances on the order of hundreds of farads.

SUMMARY OF THE INVENTION

Systems and methods in accordance with embodiments of the invention implement high-temperature tolerant supercapacitors. In one embodiment, a high-temperature tolerant super capacitor includes a first electrode that is thermally stable between at least approximately 80° C. and approximately 300° C.; a second electrode that is thermally stable between at least approximately 80° C. and approximately 300° C.; an ionically conductive separator that is thermally stable between at least approximately 80° C. and 300° C.; an electrolyte that is thermally stable between at least approximately 80° C. and approximately 300° C.; where the first electrode and second electrode are separated by the separator such that the first electrode and second electrode are not in physical contact; and where each of the first electrode and second electrode is at least partially immersed in the electrolyte solution.

In another embodiment, at least one of the first electrode and the second electrode includes carbon.

In yet another embodiment, the carbon is in the form of one of: woven carbon cloth, carbon aerogel, and activated carbon.

In still another embodiment, the carbon is porous.

In yet still another embodiment, the carbon's surface area per unit mass is greater than approximately 1000 $m^2/g$.

In a further embodiment, the carbon's surface area per unit mass is greater than approximately 2000 $m^2/g$.

In a yet further embodiment, the carbon is embodied within Spectracarb 2225.

In a still further embodiment, at least one of the first electrode and the second electrode includes a composite material.

In a still yet further embodiment, at least one of the first electrode and the second electrode includes a composite material used in conjunction with a binder that is thermally stable between at least approximately 80° C. and approximately 300° C.

In another embodiment, the binder is polytetrafluoroethylene.

In yet another embodiment, the electrolyte is used in conjunction with a solvent that is thermally stable between at least approximately 80° C. and approximately 300° C.

In still another embodiment, the electrolyte is in the form of an ionic liquid.

In still yet another embodiment, the ionic liquid includes a pyrrolidinium-based cation.

In a further embodiment, the ionic liquid includes an imidazolium-based cation.

In a still further embodiment, the ionic liquid is one of: 1-butyl-3-methylimidazolium bis(trifluoromethylsulfonyl)imide (BMIm) and 1-butyl-1-methylpyrrolidinium bis(trifluoromethylsulfonyl)imide (BMPIm).

In a yet further embodiment, the separator includes one of: zirconia, silica, glass mat fiber, silicon carbide, boron nitride, zirconium oxide, and a polymer.

In a yet still further embodiment, the separator includes Zircar Type ZYK-15.

In another embodiment, the first electrode, the second electrode, the ionically conductive separator, and the electrolyte, are arranged such that they can act in aggregate to enable the operation of a supercapacitor.

In yet another embodiment, the first electrode, the second electrode, the ionically conductive separator, and the electrolyte, are arranged such that they can act in aggregate to enable the operation of a supercapacitor that can withstand a charging voltage of greater than approximately 1.5 volts.

In still another embodiment, the first electrode, the second electrode, the ionically conductive separator, and the electrolyte, are arranged such that they can act in aggregate to enable the operation of a supercapacitor that can exhibit a round-trip efficiency of greater than approximately 90%.

DETAILED DESCRIPTION

Turning now to the drawings, systems and methods for implementing high-temperature tolerant supercapacitors are illustrated. In many embodiments, a high-temperature tolerant supercapacitor is constituted of materials, and is otherwise configured, such that the supercapacitor can sustain viable operation at temperatures above approximately 80° C. In several embodiments, a high-temperature tolerant supercapacitor is constituted of materials, and is otherwise configured, such that it can sustain viable operation at temperatures above approximately 85° C. In numerous embodiments, a high-temperature tolerant supercapacitor is constituted of materials, and is otherwise configured, such that it can sustain viable operation in temperatures between at least approximately 80° C. and approximately 300° C. In many embodiments, a high-temperature tolerant supercapacitor has a capacitance of greater than approximately 1.0 farads. In numerous embodiments, a high-temperature tolerant supercapacitor can withstand applied voltages of greater than approximately 1.5 volts. In several embodiments, a high-temperature tolerant supercapacitor includes thermally stable electrodes, at least one of which is characterized by a high surface area. In numerous embodiments, a high-temperature tolerant supercapacitor includes a thermally stable ionically conductive separator that is based on one of: zirconia and silica. In many embodiments, the high-temperature tolerant supercapacitor utilizes a thermally stable electrolyte solution that includes a thermally stable solvent characterized by a high boiling point and a low vapor pressure, and further includes a thermally stable salt. In some embodiments, a high-temperature tolerant supercapacitor utilizes a thermally stable ionically conductive liquid that may or may not include a thermally stable salt.

Storing and delivering electrical energy at high temperatures remains a potent engineering challenge. Indeed, many applications would substantially benefit from the development of systems that are more robustly capable of storing and delivering electrical energy at high temperatures. For example, many aeronautical/aerospace applications can benefit, e.g., the development of robotic spacecraft (planetary atmosphere probes) and the development of electric aircraft can benefit from viable solutions for storing and delivering electrical energy at high temperature. Likewise, these viable solutions can be extended for application in the automotive industries as well as the oil, gas, and geothermal industries.

Presently, lithium-ion battery chemistries can typically operate safely to approximately 65° C., while some polymer batteries can typically operate safely to approximately 80° C. Molten salt batteries based on a sodium anode, a sulfur or metal chloride-based cathode, and a sodium ion conducting solid state electrolyte/separator can operate at temperatures even higher than 300° C. Moreover, there do exist some capacitors that are configured for high temperature operation, albeit at much smaller capacities. For example, U.S. patent application Ser. No. 13/804,301 entitled "Micro- and Nanoscale Capacitors that Incorporate an Array of Conductive Elements Having Elongated Bodies" to Manohara et al. describes capacitors that can be configured for high-temperature operation. The disclosure of U.S. patent application Ser. No. 13/804,301 is hereby incorporated by reference in its entirety. Generally, there exist certain electrolytic and ceramic capacitors that can operate in the range from approximately room temperature to approximately 400° C. However, these capacitors typically have capacitances on the order of microfarads, and are typically configured to sustain discharge times on the order of less than one second. Accordingly, there exists a need for more potent capacitors—i.e. supercapacitors—that demonstrate more robust performance characteristics at high temperatures.

The present application discloses supercapacitors that meet this need. For example, in many embodiments, a high-temperature tolerant supercapacitor that is capable of operation between a temperature range of at least between approximately 80° C. and 300° C. and can withstand a charge voltage of greater than approximately 1.5 volts includes: first and second electrodes that are thermally stable between at least approximately 80° C. and approximately 300° C., an ionically conductive separator that is thermally stable between at least approximately 80° C. and approximately 300° C. that is based on zirconia, silica, or a similar such material, and an electrolyte that is thermally stable between at least approximately 80° C. and approximately 300° C. In a number of embodiments, at least one electrode is a carbon electrode, and the electrolyte is 1-butyl-1-methylpyrrolidinium bis(trifluoromethylsulfonyl)imide (BMPIm). The general principles of supercapacitors operation is now discussed below.

General Principles of Supercapacitor Operation

Figure 1A:
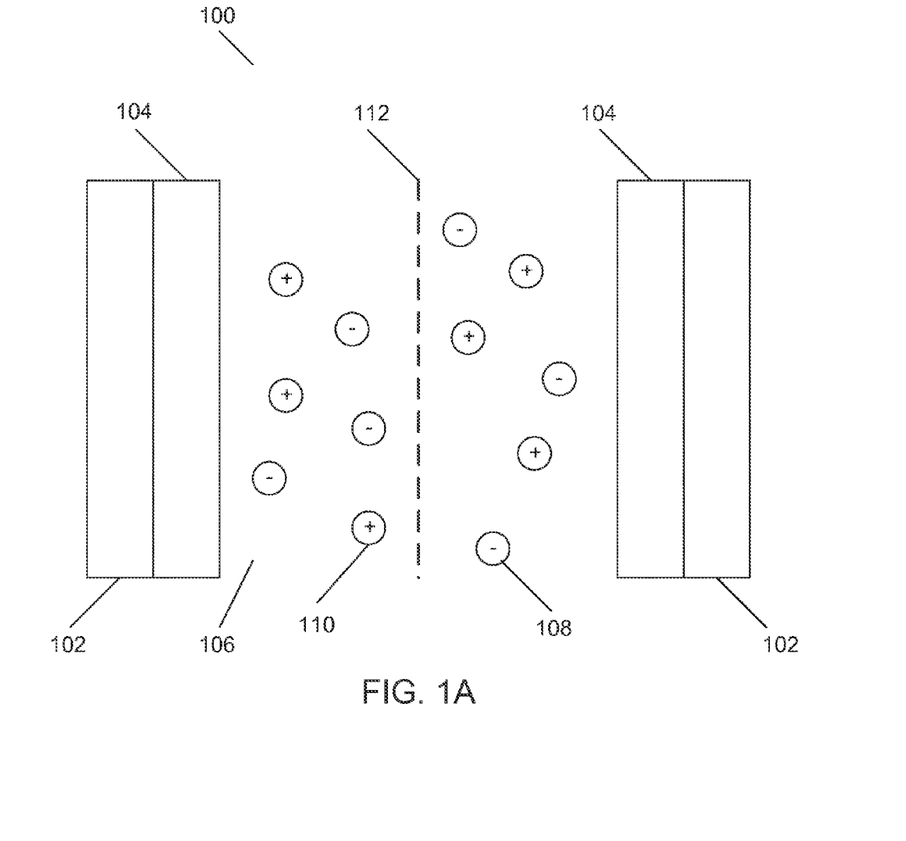
FIGS. 1A-1C illustrate the general principles underlying the double layer phenomenon that can occur within supercapacitors in accordance with certain embodiments of the invention.
Figure 1B:
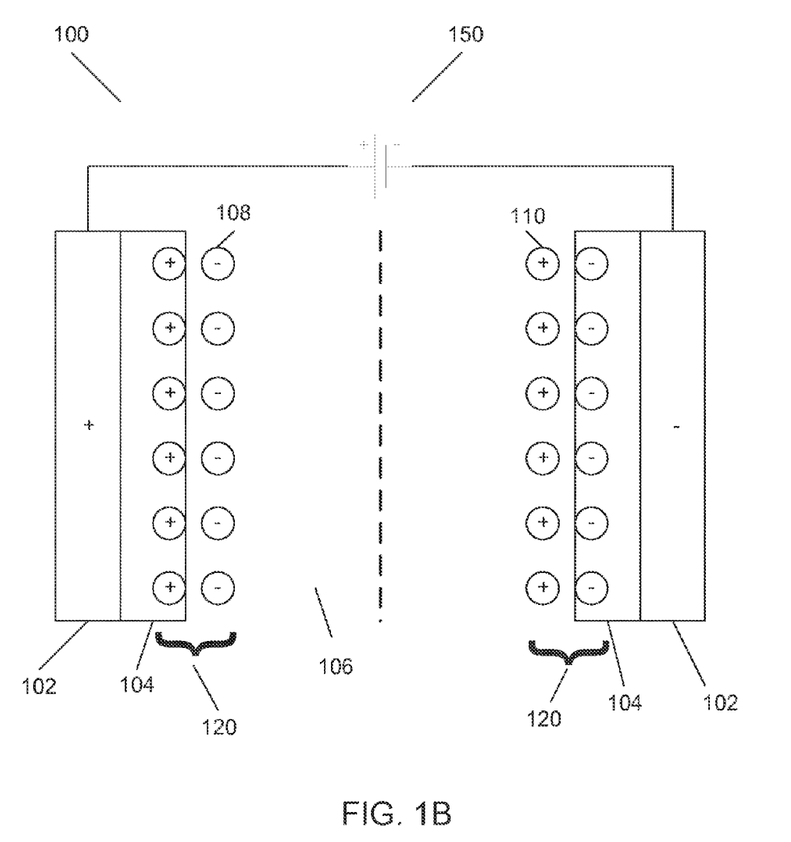
Figure 1C:
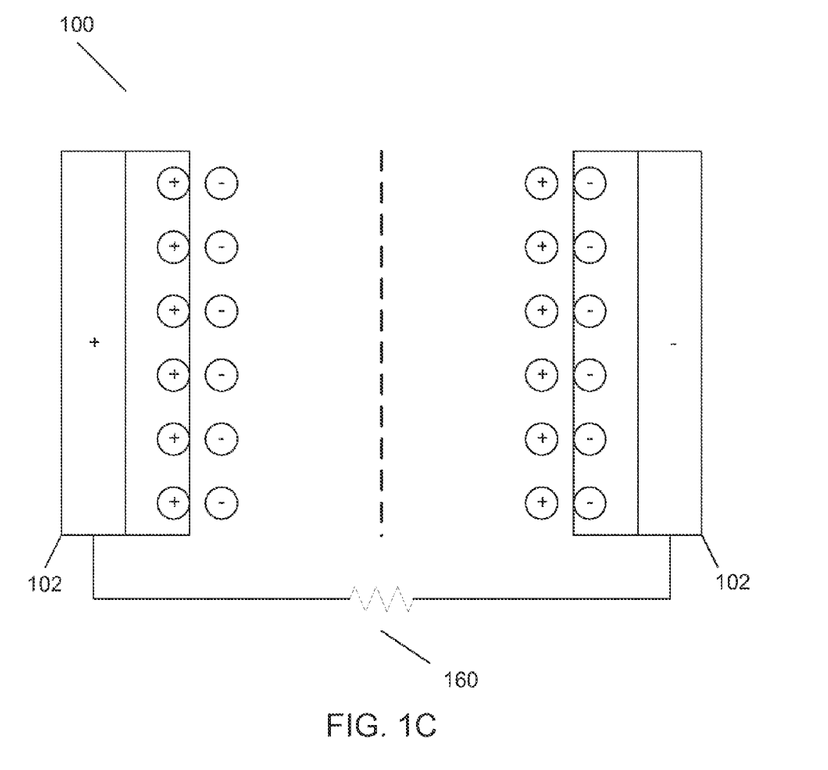

Whereas conventional capacitors store energy in an electric field that directly results from the potential difference established across two conductive plates, it is generally understood that supercapacitors largely store energy in electric fields that correspond to some combination of double-layer capacitance phenomena and pseudocapacitive phenomena. To provide context, FIGS. 1A-1C illustrate the basic principles of double layer capacitance within a supercapacitor. In particular, FIG. 1A depicts a supercapacitor in a depleted state. More specifically, the supercapacitor 100 includes two current collectors 102, each of which being in electrical contact with an electrode 104, and each of the electrodes 104 being at least partially immersed in an electrolyte solution 106. The electrolyte solution 106 includes anions 108 and cations 110. A separator 112 physically separates the two electrodes such that they are not in physical contact.

FIG. 1B illustrates the charging of the supercapacitor seen in FIG. 1A. In particular, the supercapacitor 100 is depicted as being coupled to a battery 150. More specifically, each of the current collectors 102 is coupled to a respective terminal of the battery 150. Consequently, one of the electrodes 104 becomes positively charged while the other electrode 104 becomes negatively charged. The charging of the electrodes has the effect of reorienting the anions 108 and cations 110 in the electrolyte solution 106 so as to cause the development of what is known as a 'double layer' 120 at the solid/liquid interface. In other words, when a first of the electrodes 104 becomes positively charged, it defines a first positively charged layer, and thereby attracts a coating of anions 108 that define a second negatively charged layer. Importantly, these layers are separated by a distance that is on the order of nanometers. This small separation distance is a principle reason why supercapacitors can have extremely high capacitances (recall that the capacitance of a capacitor is inversely proportional to the distance separating constituent charges).

FIG. 1C depicts that the charged capacitor 100 can be used to power a load. In particular, it is depicted that the current collectors 102 of the supercapacitor 100 are electrically coupled to opposite terminals of a load 160.

Of course, it should be understood that although FIGS. 1A-1C depict double layer capacitance phenomena that can occur in a supercapacitor, embodiments of the invention are not restricted to supercapacitors that rely on the occurrence of this phenomenon. For instance, many supercapacitors rely on pseudocapacitive phenomena to achieve their desired performance characteristics. Embodiments of the invention can be implemented in conjunction with any suitable supercapacitor, including those that rely on double capacitance, those that rely on pseudocapacitance, and those that utilize some combination of those phenomena to store and deliver electrical energy. The constituent components of high-temperature tolerant supercapacitors are now discussed in greater detail below.

High-Temperature Tolerant Supercapacitors—Electrodes

Although supercapacitors possess a host of desirable energy storage and power delivery characteristics, currently existing supercapacitors are largely constrained to operation at temperatures below 85° C. For instance, currently existing supercapacitors can exhibit cycle lives as high as one million cycles at approximately 25° C., however, they tend to demonstrate notable performance degradation when operating at temperatures around approximately 85° C. Many of these supercapacitors are unable to sustain high temperature operation since they do not have appropriate constituent components. For example, many presently existing supercapacitors rely on electrolyte solutions that have solvents with low boiling points (e.g. acetonitrile) and/or electrodes that do not have sufficiently stable binders. The efforts thus far at using certain ionic liquids as the electrolyte solution to improve high-temperature tolerance have been deficient insofar as the ionic liquids tested thus far have resulted in reduced capacity retention and/or reduced coulombic efficiency at voltages greater than approximately 1.5 volts. Thus, suitable component combinations that can enable viable high-temperature operation are still needed.

Accordingly, this application discloses such combinations that achieve desirable results. For example, in many embodiments, a high-temperature tolerant supercapacitor includes a thermally stable electrode that can withstand a temperature range between approximately 80° C. and 300° C. It is observed that the thermal stability of electrodes in many instances hinges on the thermal stability of any of its associated binders—recall that binders are typically used for the purpose of facilitating the adhesion of the electrode to the associated current collector. Thus, the thermal stability of the electrode can be enhanced by either 1) implementing electrodes that do not require such binders or 2) implementing electrodes that utilize binders, where the binders themselves are thermally stable within the desired temperature range.

For example, in many embodiments, a high-temperature tolerant supercapacitor implements a binder-free carbon electrode, e.g. woven carbon cloth, nano-structured carbon materials, and/or carbon aerogel materials. In numerous embodiments, the electrode is activated carbon. Activated carbon is characterized by its porosity, and its corresponding vast surface area. The activated carbon can be nanoporous, micro porous, or mesoporous. In many instances, the pore-size is particularly customized to accommodate the size of the electrolyte cations/anions. In general, activated carbon can be accommodate a range of pore sizes. As can be appreciated, the capacitance of a capacitor is largely proportional to the exposed surface area of its electrodes. In other words, the porosity of the electrode is associated with the surface area upon which the aforementioned double layer can develop. Accordingly, in many instances, it is desirable to implement electrodes that have a large surface area. Thus, for example, in many embodiments the electrode is constituted of Spectracarb 2225; Spectracarb 2225 is a woven carbon cloth, and has a surface area of greater than approximately 2000 $m^2/g$. Of course, it is not a prerequisite to implement electrodes that have surface areas as high as 2000 $m^2/g$; for instance, in many embodiments, electrodes that have a surface area of greater than 1000 $m^2/g$ are implemented. In many instances, such high surface areas can enable the high-temperature tolerant supercapacitor to achieve capacitances greater than approximately 1.0 farads. In some instances, the high surface areas can enable the high-tolerant supercapacitor to achieve capacitances greater than approximately 1.5 farads. Moreover, while electrodes that have high surface areas may be preferable in many instances, embodiments of the invention are not so constrained. Further, embodiments of the invention are not constrained to achieving supercapacitors having some specific capacitance value (e.g. 1.0 farads); high-temperature supercapacitors in accordance with many embodiments of the invention can have any suitable capacitance. For example, as can be appreciated, the capacitances of high-temperature tolerant supercapacitors can be scaled to any suitable value. Additionally, while carbon electrodes are discussed, it should be clear that embodiments of the invention are not constrained to implementing electrodes that are carbon-based. For example, in some embodiments, at least one electrode includes a composite material in conjunction with a thermally stable binder. For instance, in some embodiments, polytetrafluoroethylene (e.g. Teflon) is used as the thermally stable binder. But more generally, any suitable electrode that can sustain operation of the associated supercapacitor at temperatures between approximately 80° C. and 300° C. can be implemented in accordance with many embodiments of the invention.

While specific electrodes can be implemented to promote the viable high-temperature operation of capacitors (as discussed above), in many embodiments, the electrolyte solution within a supercapacitor is also selected so as to promote viable high-temperature operation, and this is now discussed in greater detail below.

High-Temperature Tolerant Supercapacitors—Electrolytes and Electrolyte Solutions Many presently available supercapacitors utilize electrolyte solutions that do not allow them to operate at high temperatures. For example, in many presently existing supercapacitors, acetonitrile is used as the solvent. However, this solvent is not useful for high-temperature operation as it has a relatively low boiling point. As mentioned previously, there have been efforts to develop supercapacitors that are capable of high-temperature operation based on the implementation of ionic liquids. However, as stated above, these efforts have been deficient insofar as the resulting cells have demonstrated reduced capacity retention and/or reduced coulombic efficiency at the highest working voltages (typically greater than approximately 1.5 volts). Accordingly, in many embodiments of the invention, a supercapacitor implements either a conventional electrolyte solution or an ionic liquid that is far better configured for high-temperature operation. For example, in many embodiments, an electrolyte solution is selected that is thermally stable between 80° C. and 300° C., having a high boiling point, e.g. greater than approximately 300° C., a low vapor pressure, and high thermal stability (for example, the constituent components of the electrolyte solution—the electrolyte and the solvent—can possess those characteristics). Electrolyte solutions having a low vapor pressure are desirable insofar as there is a lesser risk of inadvertent vapor pressure buildup within the cell of the supercapacitor. Where ionic liquids are implemented, it has been observed that ionic liquid with a pyrrolidinium based cation facilitates a higher maximum charge voltage (based on its higher cathodic limit) relative to imidazolium based ionic liquids. Accordingly, in many embodiments, an ionic liquid with a pyrrolidinium based cation is used as the electrolyte. In some embodiments, an imidazolium based ionic liquid is used. In numerous embodiments, the implemented electrolyte solution has an electrochemical window of greater than approximately 4.5 volts. In many embodiments, the electrolyte has an electrochemical window of greater than approximately 6.0 volts. In many instances, it is preferable that the electrolyte solution have a large electrochemical window as large electrochemical windows can be associated with higher maximum charging voltages. In some embodiments, the selected electrolyte solution is constituted of a thermally stable solvent, having a decomposition temperature greater than 300° C. as well as a thermally stable salt—i.e. thermally stable between at least approximately 80° C. and 300° C. In a number of embodiments, a thermally stable ionic conductive liquid is used. The ionic conductive liquid may or may not include a thermally stable salt. In some embodiments, the ionic liquid is one of: 1-butyl-3-methlimidazolium bis(trifluoromethylsulfonyl)imide (BMIm) and 1-butyl-1-methylpyrrolidinium bis(trifluoromethylsulfonyl)Imide (BMPIm). Table 1 below includes data regarding each of those ionic liquids.

tor is fabricated from one of a zirconia based material and a silica based material. However, any material that can sustain high-temperature operation within the desired temperature range can be implemented in accordance with embodiments of the invention. For instance, the separator can include one of glass mat fiber, silicon carbide, boron nitride, zirconium oxide, etc. It can also include a thermally stable ionically conductive polymer. Generally, any separator that is thermally stable within the temperature range of between approximately 80° C. and 300° C. can be implemented in a supercapacitor in accordance with embodiments of the invention.

Against this disclosure, an example of developing a particular supercapacitor that can sustain high-temperature operation in accordance with an embodiment of the invention is presented below.

High-Temperature Tolerant Supercapacitor—Example 2032 coin cells were assembled and tested up to approximately 160° C. The electrodes were fabricated from Spectracarb 2225, which can be characterized as a high surface area woven carbon cloth. The electrode material had a surface area of greater than approximately 2000 m$^2$/g. Following sputter deposition with platinum to reduce contact resistance to the cell casing, 1.6 cm diameter electrodes, having a thickness of approximately 0.5 mm, were punched from sheets of Spectracarb 2225 and dried in a vacuum oven at 100° C. The

TABLE 1

Examples of Suitable Ionic Liquids for Implementation within High-Temperature Tolerant Supercapacitors

| Ionic liquids | Decomposition Temperature (° C.) | Conductivity (mS/cm) | Electrochemical Window (V) |
|---|---|---|---|
| 1-butyl-3-methlimidazolium bis (trifluoromethylsulfonyl) imide (BMIm) | 439 | 3.9 (20° C.) | 4.5 (−2 to 2.5)* |
| 1-butyl-1-methylpyrrolidinium bis (trifluoromethylsulonyl) imide (BMPIm) | 340 | 2.2 (25° C.) | 6.0 (−3.0 to 3.0)** |

*vs. Ag/Ag$^+$ in dimethylsulfoxide
**vs. Ag/Ag$^+$

Figure 2A:
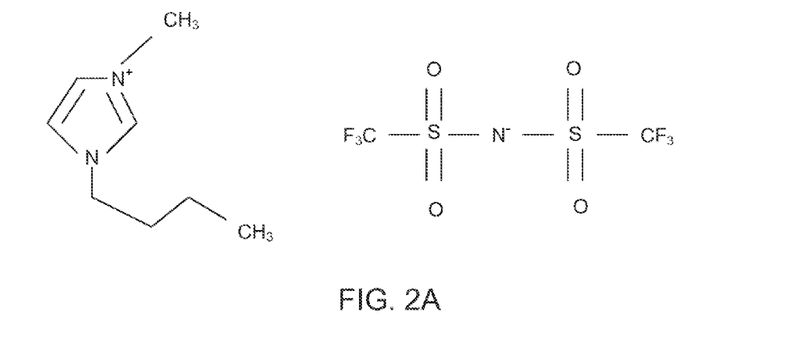
FIGS. 2A and 2B depict the molecular structures for 1-butyl-3-methlimidazolium bis(trifluoromethylsulfonyl)imide (BMIm) and 1-butyl-1-methylpyrrolidinium bis(trifluoromethylsulfonyl)imide (BMPIm), which can be implemented as electrolytes within high-temperature tolerant supercapacitors in accordance with certain embodiments of the invention.
Figure 2B:
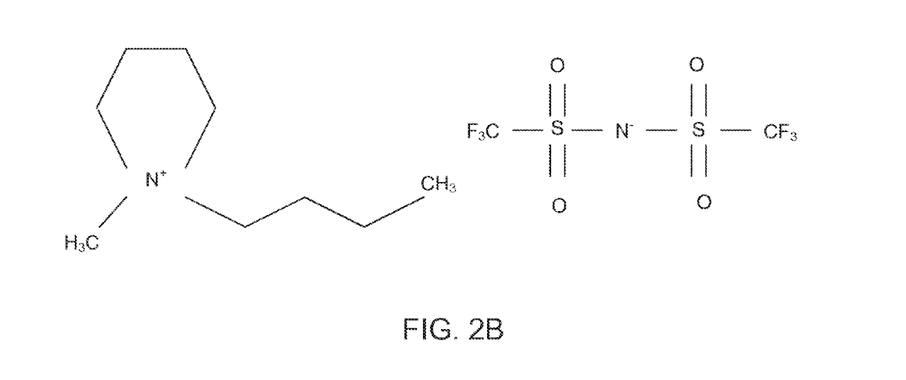

FIGS. 2A and 2B depict the molecular structures for 1-butyl-3-methlimidazolium bis(trifluoromethylsulfonyl)imide (BMIm) and 1-butyl-1-methylpyrrolidinium bis(trifluoromethylsulfonyl)imide (BMPIm), respectively.

Of course, it should be clear that although certain examples of suitable electrolytes and electrolyte solutions that are consistent with high-temperature operation are provided, any of a number of electrolytes and electrolyte solutions can be implemented. For example, any suitable electrolyte and electrolyte solution that is stable between at least approximately 80° C. to approximately 300° C. and having a high boiling point, low vapor pressure, and high thermal stability can be implemented in accordance with embodiments of the invention.

Along the lines of the discussion above, in many embodiments, the separator is chosen to promote high-temperature operation, and this aspect is now discussed in greater detail below.

High-Temperature Tolerant Supercapacitors—Separator

In many embodiments, constituent separators within high-temperature tolerant supercapacitors are specifically chosen that can withstand high-temperature operation. For example, in many embodiments, the separator is thermally stable from at least between approximately 80° C. and approximately 300° C. For instance, in numerous embodiments, the separator was similarly prepared from zirconia cloth (Zircar Type ZYK-15). Two groups of supercapacitors were fabricated—one using 1-butyl-3-methylimidazolium bis(trifluoromethylsulfonyl)imide (BMIm) and the other using 1-butyl-1-methylpyrrolidinium bis(trifluoromethylsulfonyl)imide (BMPIm).

Figure 3:
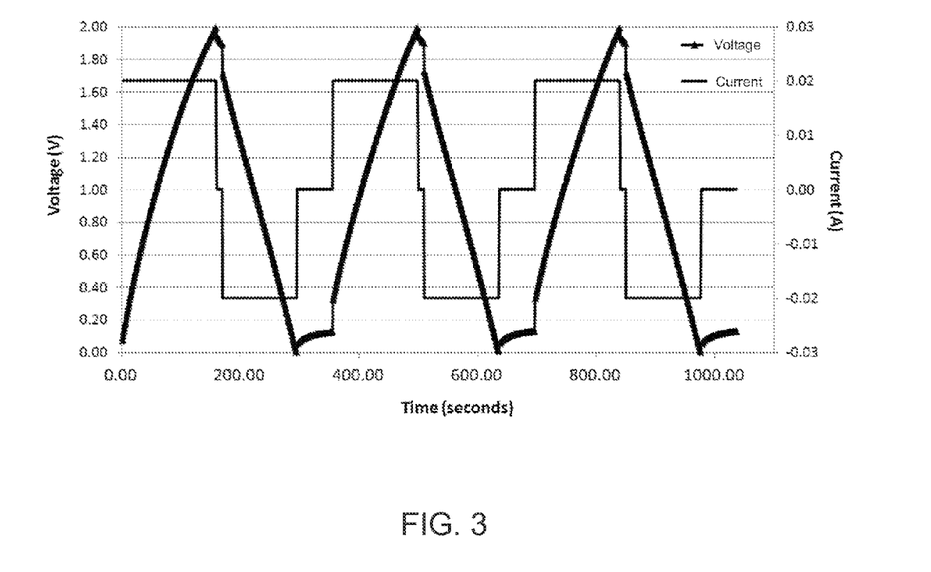
FIG. 3 depicts representative data for a high-temperature tolerant supercapacitor constructed in accordance with certain embodiments of the invention.

The cells were assembled in an inert atmosphere glovebox filled with argon. After crimp sealing, the edges of the cells were sealed with a high-temperature epoxy material (Permatex room temperature vulcanizing silicone sealant) and cured at room temperature, to further improve the integrity of the cells during testing. Nickel tabs were spot welded to the coin cell casing to facilitate interconnection to the test leads. Testing was conducted in a thermal chamber at 160° C., using constant current charging/discharging. Several maximum charging voltage limits (Vmax) were used, between 1 and 2.5V. The capacitance was extracted from the linear region of the discharge curve from dV/dt=C/i where V=voltage, t=time, C=capacitance and i=current. The round-trip efficiency was determined from the ratio of charge in vs. charge out over the full voltage range of 0 to Vmax. Representative charging/discharging data is depicted in FIG. 3, and listed in table 2 below. More specifically, FIG. 3 depicts representative charging/discharging data for the high-temperature tolerant super capacitor at 160° C.

| Electrolyte | Maximum Charge Voltage (V) | Capacitance (farads) | Round-trip efficiency (charge/discharge) |
|---|---|---|---|
| BMIm | 1.5 | 1.6 | 94% |
| BMIm | 2 | 1.6 | 88% |
| BMIm | 2.5 | 1.7 | 46% |
| BMPIm | 1.5 | 1.4 | 94% |
| BMPIm | 2 | 1.5 | 88% |
| BMPIm | 2.5 | 1.7 | 79% |

In essence, the above-described fabrication procedure resulted in a high-temperature tolerant supercapacitor that can achieve capacitances greater than approximately 1.4 farads, round-trip efficiencies greater than 90% at maximum voltages of greater than approximately 1.5 volts.

While a particular example as been discussed, it should be abundantly clear that embodiments of the invention are not constrained to the discussed example. Indeed, as can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A high-temperature tolerant supercapacitor comprising:
    a first electrode that is thermally stable between at least approximately 80° C. and approximately 300° C.;
    a second electrode that is thermally stable between at least approximately 80° C. and approximately 300° C.;
        wherein at least one of the first electrode and the second electrode comprises a composite material used in conjunction with a binder that is thermally stable between at least approximately 80° C. and approximately 300° C.;
    an ionically conductive separator that is thermally stable between at least approximately 80° C. and 300° C.; and
    an electrolyte that is thermally stable between at least approximately 80° C. and approximately 300° C.;
        wherein the first electrode and second electrode are separated by the separator such that the first electrode and second electrode are not in physical contact; and
        wherein each of the first electrode and second electrode is at least partially immersed in the electrolyte solution.

2. The high-temperature tolerant supercapacitor of claim 1, wherein at least one of the first electrode and the second electrode comprises carbon.

3. The high-temperature tolerant supercapacitor of claim 2, wherein the carbon is in the form of one of: woven carbon cloth, carbon aerogel, and activated carbon.

4. The high-temperature tolerant supercapacitor of claim 3, wherein the carbon is porous.

5. The high-temperature tolerant supercapacitor of claim 4, wherein the carbon's surface area per unit mass is greater than approximately 1000 $m^2/g$.

6. The high-temperature tolerant supercapacitor of claim 5, wherein the carbon's surface area per unit mass is greater than approximately 2000 $m^2/g$.

7. The high-temperature tolerant supercapacitor of claim 6, wherein the carbon is embodied within Spectracarb 2225.

8. The high-temperature tolerant supercapacitor of claim 1, wherein the binder is polytetrafluoroethylene.

9. The high-temperature tolerant supercapacitor of claim 1, wherein the electrolyte is used in conjunction with a solvent that is thermally stable between at least approximately 80° C. and approximately 300° C.

10. The high-temperature tolerant supercapacitor of claim 1, wherein the electrolyte is in the form of an ionic liquid.

11. The high-temperature tolerant supercapacitor of claim 10, wherein the ionic liquid comprises a pyrrolidinium-based cation.

12. The high-temperature tolerant supercapacitor of claim 10, wherein the ionic liquid comprises an imidazolium-based cation.

13. The high-temperature tolerant supercapacitor of claim 10, wherein the ionic liquid is one of: 1-butyl-3-methlimidazolium bis(trifluoromethylsulfonyl)imide (BMIm) and 1-butyl-1-methylpyrrolidinium bis(trifluoromethylsulfonyl)imide (BMPIm).

14. The high-temperature tolerant supercapacitor of claim 1, wherein the separator comprises one of: zirconia, silica, glass mat fiber, silicon carbide, boron nitride, zirconium oxide, and a polymer.

15. The high-temperature tolerant supercapacitor of claim 1, wherein the separator comprises Zircar Type ZYK-15.

16. The high-temperature tolerant supercapacitor of claim 1, wherein the first electrode, the second electrode, the ionically conductive separator, and the electrolyte, are arranged such that they can act in aggregate to enable the operation of a supercapacitor.

17. The high-temperature tolerant supercapacitor of claim 16, wherein the first electrode, the second electrode, the ionically conductive separator, and the electrolyte, are arranged such that they can act in aggregate to enable the operation of a supercapacitor that can withstand a charging voltage of greater than approximately 1.5 volts.

18. The high-temperature tolerant supercapacitor of claim 17, wherein the first electrode, the second electrode, the ionically conductive separator, and the electrolyte, are arranged such that they can act in aggregate to enable the operation of a supercapacitor that can exhibit a round-trip efficiency of greater than approximately 90%.

19. The high-temperature tolerant supercapacitor of claim 17, wherein the electrolyte is characterized by a low vapor pressure.

* * * * *